United States Patent [19]

McGaha

[11] Patent Number: 5,278,396
[45] Date of Patent: Jan. 11, 1994

[54] PRINTER SLIP TABLE WITH INTEGRAL SCANNER

[75] Inventor: Jerry A. McGaha, Gainesville, Ga.

[73] Assignee: NCR Corporation, Dayton, Ohio

[21] Appl. No.: 818,303

[22] Filed: Jan. 8, 1992

[51] Int. Cl.[5] .......................................... G06K 15/00
[52] U.S. Cl. .................................. 235/432; 235/375; 235/383; 235/462
[58] Field of Search ................. 235/383, 432, 462, 375

[56] References Cited

U.S. PATENT DOCUMENTS

| | | | |
|---|---|---|---|
| 3,059,112 | 10/1962 | Rogal | 235/383 |
| 4,084,742 | 4/1978 | Silverman | 235/383 |
| 4,791,281 | 12/1988 | Johnsen et al. | 235/383 |
| 4,859,839 | 8/1989 | Tetelman et al. | 235/385 |
| 4,902,880 | 2/1990 | Garczynski et al. | 235/375 |
| 5,053,607 | 10/1991 | Carlson et al. | 235/432 |
| 5,079,412 | 1/1992 | Sugiyama | 235/383 |
| 5,113,060 | 5/1992 | Wike, Jr. et al. | 235/383 |
| 5,128,520 | 7/1992 | Rando et al. | 235/462 |

Primary Examiner—John Shepperd
Attorney, Agent, or Firm—Paul W. Martin

[57] ABSTRACT

A printer slip table which employs a laser scan module in combination with a printer to expedite checkout and return of merchandise articles. The scan module may be employed to scan bar code labels on slips attached to the articles, coupons, and previous receipts for return articles. The printer may be a single printer or a plurality of specialized printers. The printer prints receipts, voids coupons by printing seller information thereon, and prints journals. The printer may additionally print buyer information on coupons and return information on receipts, slips, and journals. Return information, such as purchase date and location, may be encoded as a bar code label to be scanned upon return.

5 Claims, 3 Drawing Sheets

PRINTER SLIP TABLE WITH INTEGRAL SCANNER

BACKGROUND OF THE INVENTION

The present invention relates to optical scanners and printers and more specifically to a printer slip table with integral scanner.

Many retail products are identified by the same type and size of tags. These tags contain bar code labels which are read by an optical scanner for inventory control or checkout.

Commonly-assigned U.S. Pat. No. 4,971,410, entitled, "Scanning and Collection System for a Compact Laser", issued Nov. 20, 1990, to Wike, Jr. et al. discloses an optical scanner which employs a laser diode for producing a scanning beam, an optical transceiver for directing the beam against a plurality of stationary mirrors and collecting the beam after it is reflected by a bar code label, a motor for rotating the optical transceiver, and a detector for generating a signal from the returning beam. This patent is hereby incorporated by reference.

U.S Pat. No. 4,859,839 entitled "Point-of-Sale Terminal for Laundry or Dry Cleaning Establishments", issued Aug. 22, 1989, to Tetelman et al. discloses a terminal for use in laundry and dry cleaning facilities which includes a keyboard, a printer for printing a ticket, and a stationary bar code reader positioned to read a ticket being moved by a ticket transport mechanism of the printer. This patent is hereby incorporated by reference.

Retail stores are without a quick and convenient way to validate purchases or coupons. The date and location of a purchase are difficult to trace. Coupon information is entered by hand after prices have been scanned.

Therefore, it would be desirable to provide a printer with a built-in scanner to give a seller better control over returns and refunds and to allow a seller to quickly validate coupons to quicken the checkout process. It would also be desirable to provide a scanner-printer combination which translates purchase information into a bar code label which can be printed on a receipt and scanned later if returned.

SUMMARY OF THE INVENTION

In accordance with the teachings of the present invention, a printer slip table with integral optical scanner is provided. The printer slip table employs a laser scan module in combination with a printer to expedite checkout and return of merchandise articles. The scan module may be employed to scan bar code labels on slips attached to the articles, coupons, and previous receipts for return articles.

The printer may be a single printer or a plurality of specialized printers. The printer prints receipts, voids coupons by printing seller information thereon, and prints journals. The printer may additionally print buyer information, obtained through reading printed media of the buyer such as checks, on coupons, and print return information on receipts, slips, and journals. Return information, such as purchase date and location, may be encoded as a bar code label to be scanned upon return.

The printer slip table of the present invention is compact in size and has a small footprint. It includes a housing having a rectangular base member and a top member mounted onto the base member. The top member includes a first portion having upper and bottom surfaces, and a second portion perpendicular to the first portion having a lower surface above the bottom surface of the first portion and sharing the upper surface with the first portion. The upper surface of the first portion has an aperture for ejecting a receipt. The lower surface of the second portion has an aperture for emitting the scan pattern.

It is accordingly an object of the present invention to provide a printer slip table with an integral optical scanner.

It is another object of the present invention to provide a printer slip table with an integral optical scanner which has a small footprint.

It is another object of the present invention to provide a printer slip table with an integral optical scanner which prints return information on receipts, slips, and journals.

It is another object of the present invention to provide a printer slip table with an integral optical scanner which prints return information on receipts, slips, and journals as bar code labels.

It is another object of the present invention to provide a printer slip table with an integral optical scanner which prints seller and buyer information on coupons.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
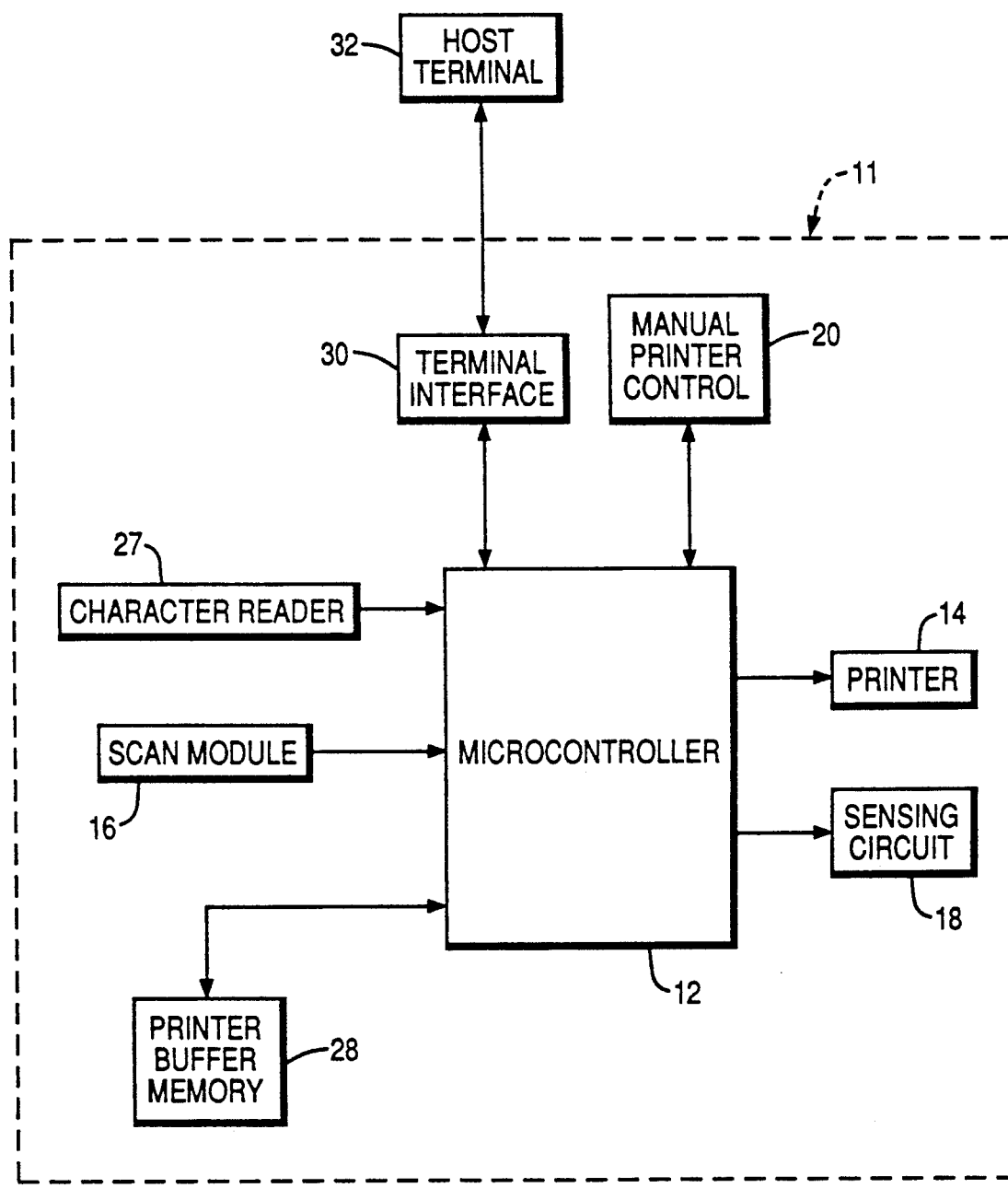
FIG. 1 is a block diagram of a first embodiment of the printer slip table of the present invention.
Figure 2:
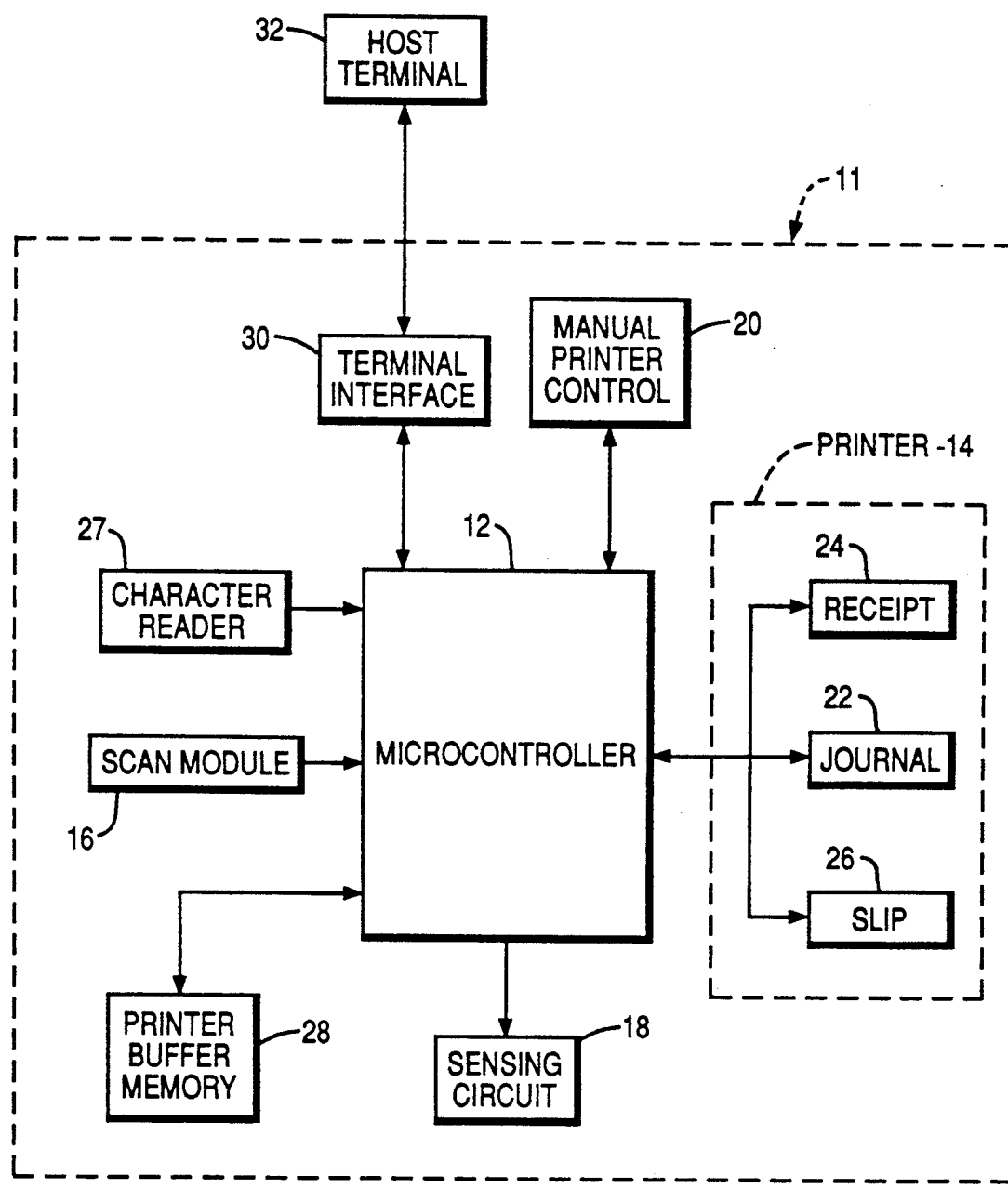
FIG. 2 is a block diagram of a second embodiment of the printer slip table of the present invention.

Referring now to FIGS. 1 and 2, printer slip table 10 includes printer control subsystem 11, which primarily includes microcontroller 12, printer 14, and scan module 16. Microcontroller 12 is the heart of printer control subsystem 11. It includes program and user memory locations. It controls data flow and monitors the status of printer 14 and scan module 16. Microcontroller 12 may be any commercially available microcontroller, such as the 8051 microcontrollers manufactured by Intel Corporation, or any commercially available microprocessor/memory combination.

Printer 14 prints purchase information, such as date, time, store location, and last-possible-return date, on records including receipts and insertable forms. It may print this information as a bar code using known methods. It also prints price and item information on receipts and journal records.

Preferably, printer control subsystem 11 also includes circuit 18 for sensing the presence of a form inserted adjacent the print head and a manual printer control circuit 20 for advancing paper, testing printer 14, and monitoring printer operation.

Printer 14 may include one printer or separate printers for each of the three types of records. Thus, as shown in FIG. 2, separate thermal printhead printers may be used as journal and receipt printers 22 and 24 and an impact dot matrix printer may be used as a slip printer 26 for printing purchase information on insertable forms. Receipt printer 24 also prints purchase information encoded as bar code labels.

Scan module 16 is preferably the one disclosed in commonly-assigned U.S. Pat. No. 4,971,410, entitled, "Scanning and Collection System for a Compact Laser", issued Nov. 20, 1990, to Wike, Jr. et al. However, other laser scan modules are also envisioned by the present invention.

Printer control subsystem 11 may also include character reader 27, such as a magnetic ink character reader or an optical character reader. Character reader 27 reads customer identification information from personal checks, when customers use them for payment, and prints the information on a voided coupon for use by the issuer of the coupon, thus providing the issuer with valuable consumer buying habits and other data.

Printer control subsystem 11 also includes printer buffer memory 28 and terminal communications interface 30. Printer buffer memory stores data to be printed. If three separate printers 22-26 are used, printer buffer-memory 28 provides a memory location for each printer.

Terminal communications interface 30 provides an interface between printer control subsystem 11 and host terminal 32. Interface 30 may be either a serial or parallel interface. Preferably, printer control subsystem 11 employs an RS 485 proprietary interface.

Advantageously, combining scanning and printing functions into a single unit reduces the footprint of the overall point-of-sale system.

Figure 3:
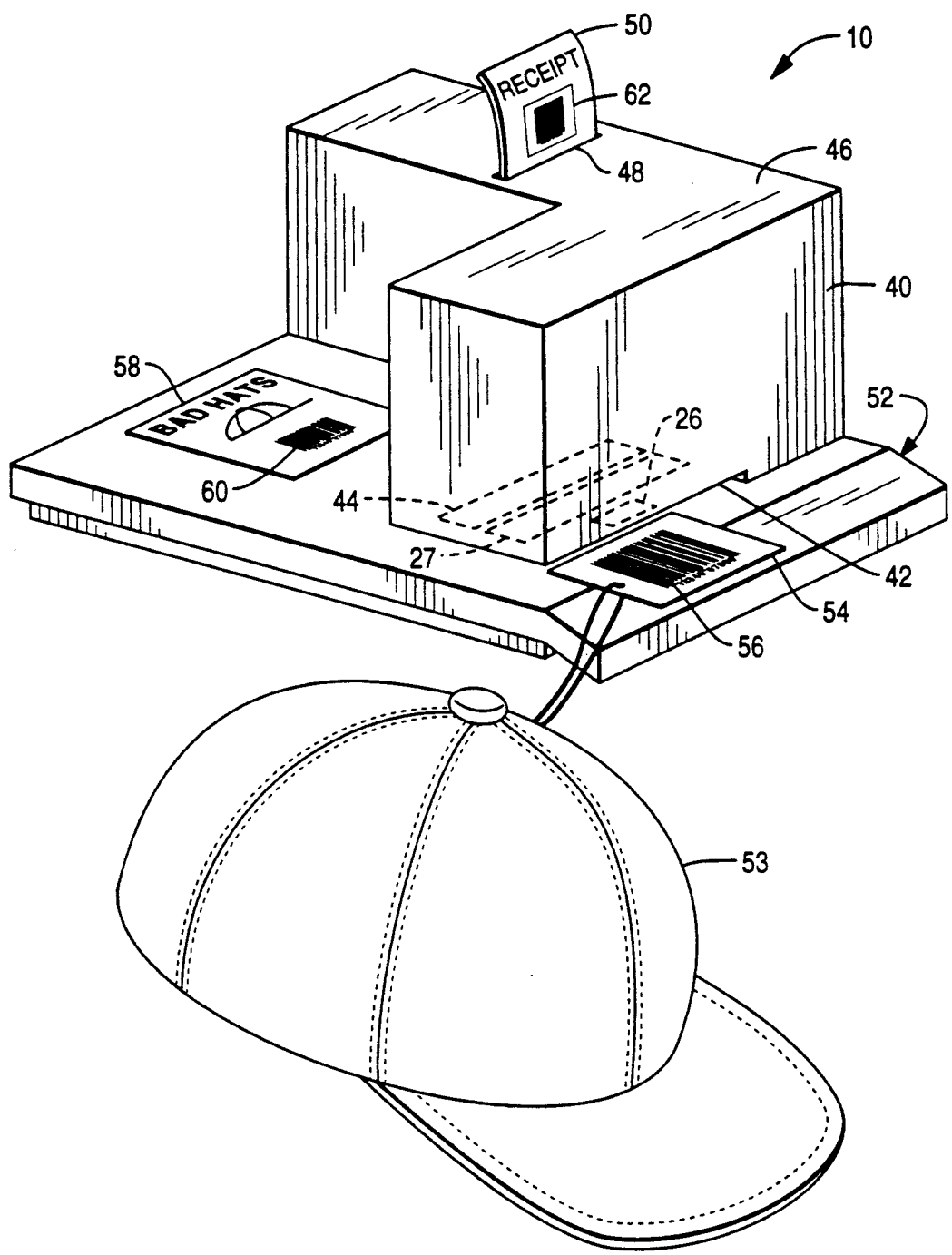
FIG. 3 is a perspective view of the printer slip table of the present invention.

Turning now to FIG. 3, printer slip table 10 includes housing 40, which contains printer control subsystem 11. Housing 40 has a lower surface 42 containing scanning window 44 through which scan module 16 emits scanning beams. Upper surface 46 contains an aperture 48 through which receipt 50 passes after it is printed.

Printer slip table 10 also includes table member 52, upon which housing 40 rests.

In operation, a garment or other merchandise item 53 having a tag 54 containing bar code 56 is passed under scanning window 44. Sensing circuit 18 activates scan module 16 to scan bar code 56. A coupon 58, if any, containing bar code 60 may then be passed under scanning window 44 to credit the transaction for the amount of the coupon.

Printer slip table 10 expedites coupon processing by voiding coupon 58. Printer 26 time and date stamps coupon 58 and prints the seller's identification information on it. If the buyer pays with a personal check, character reader 27 reads the personal information from the check and printer 14 prints the information about the buyer on coupon 58 to provide the manufacturer with consumer buying habits.

Purchase information, such as date, time, and store location, are printed directly onto receipt 50 in alphanumeric symbols or encoded by known methods and then printed as bar code label 62. If an item is returned, receipt 50 may be easily scanned to validate the return or refund. Advantageously, printer slip table 10 increases a seller's control over returns and refunds.

Price and item description are printed into the journal record and may be displayed at host terminal 32.

Although the invention has been described with particular reference to certain preferred embodiments thereof, variations and modifications of the present invention can be effected within the spirit and scope of the following claims.

What is claimed is:

1. A retail checkout apparatus comprising:
   a housing, including a base member and a top member mounted on the base member;
   a laser scan module within the top member for producing a scan pattern for reading a bar code label containing information about an article, wherein the bar code label is printed on a slip;
   a microcontroller coupled to the laser scan module;
   a first printer within the top member and coupled to the microcontroller for printing the information about the article on a receipt and information about returning the article on the receipt;
   a second printer within the top member and coupled to the microcontroller for printing the return information on the slip;
   a third printer within the top member and coupled to the microcontroller for printing the article and return information on a journal; and
   means coupled to the microcontroller for sensing the presence of the slip within the scan pattern.

2. The retail checkout apparatus as recited in claim 1, wherein the return information is printed as another bar code label.

3. A retail checkout apparatus comprising:
   a housing;
   a laser scan module within the housing for producing a scan pattern for reading a bar code label containing information about an article, wherein said bar code label is located on a receipt for the article;
   means within the housing for printing the information onto a record medium; and
   a microcontroller coupled between the laser scan module and the printing means.

4. A retail checkout apparatus comprising:
   a housing;
   a laser scan module within the housing for producing a scan pattern for reading a bar code label containing information about an article;
   means within the housing for printing the information as well as information about returning the article on a record medium; and
   a microcontroller coupled between the laser scan module and the printing means.

5. The retail checkout apparatus as recited in claim 4, wherein the return information is printed as another barcode label.

* * * * *